United States Patent

[11] 3,573,796

[72] Inventor Umar Querishi
Farnborough, England

[21] Appl. No. 719,136
[22] Filed Apr. 5, 1968
[45] Patented Apr. 6, 1971
[73] Assignee The Solartron Electronic Group Ltd.
Farnborough, England
[32] Priority May 17, 1967
[33] Great Britain
[31] 22890/67

[54] SUCCESSIVE APPROXIMATION ANALOG-TO-DIGITAL CONVERTERS
4 Claims, 3 Drawing Figs.

[52] U.S. Cl. ........ 340/347
[51] Int. Cl. ........ H03k 13/04
[50] Field of Search ........ 340/347; 324/99 (D)

[56] References Cited
UNITED STATES PATENTS

| | | | |
|---|---|---|---|
| 2,997,704 | 8/1961 | Gordon et al. | 340/347 |
| 3,483,550 | 12/1969 | Max | 340/347 |
| 3,216,001 | 11/1965 | Hinrichs | 340/347 |

*Primary Examiner*—Daryl W. Cook
*Assistant Examiner*—Gary R. Edwards
*Attorneys*—William R. Sherman, S. F. Moore and Jerry M. Presson

ABSTRACT: In a successive approximation digital voltmeter including a signal comparator and a plurality of decade ranges, the second most significant decade range is allowed to contribute more than 9 of its digits to the comparison signal which is compared by the comparator against an input signal under measurement. The excess contribution made available by this range is utilized to compensate for voltage overshoots in the comparator output signal which may result when a relativity large valued signal is applied to the comparator by the most significant decade range.

INVENTOR.
Umar Quereshi
BY
[signature]
ATTORNEY

SUCCESSIVE APPROXIMATION ANALOG-TO-DIGITAL CONVERTERS

This invention relates generally to analog-to-digital converters and more particularly to analog-to-digital converters of the successive approximation type.

Analog-to-digital converters (ADC's) s) of the successive approximation type are well known (see for example "Computer Handbook" Huskey & Korn, 1962 pp. 18.32 to 18.34) and are commonly used as digital voltmeters. The input signal (voltage or current) is compared with a comparison signal made up of the sum of selected ones of a succession of decreasing standard signals. If the selection of a standard signal causes the comparison signal to exceed the input signal, the standard signal is rejected; otherwise it is retained in the comparison signal. In either event the next standard signal is tested and the procedure continues until the least significant standard signal (one bit) has been tested. The comparison signal then equals the input signal to within one bit and a digital measure of the input signal is provided by those standard signals which have been selected.

It is customary to arrange the standard signals in a series of ranges, usually decade ranges, in each of which the signals follow some binary coded sequence, such as 8, 4, 2, 1 or 4, 2, 2, 1. It will be convenient to call the size of the least significant signal in a range one digit of that range and to call the digit of the least significant range one bit. If a converter has 5 decade ranges for example, the first range (i.e. the most significant range) has a digit of $10^4$ bits, the second range has a digit of $10^3$ bits and so on.

In a successive approximation ADC, the largest standard signal which can be used, is determined, for a given bit size (say 100$\mu$V) and a given speed of operation (say 250$\mu$sec. test time per standard signal), by the point at which overloading occurs. As described in greater detail below, this overloading causes the comparison signal to overshoot with consequent erroneous measurement of input signals which are equal to or slightly in excess of the largest standard signals. Hence a limitation is imposed upon the overall range (full house) of the ADC.

It is an object of this invention to enable the overall range of a successive approximation analog-to-digital converter to be extended without slowing its speed of operation.

According to the present invention, in a successive approximation ADC whose standard signals are arranged in a series of ranges, the logic controlling the $N$th range (where $N$ is greater than 1) is arranged to permit this range to contribute a total signal to the comparison signal; which total signal ranges from one $N$th range digit up to one ($N$–1) th range digit In the simplest case $N$ is 2.

This is in contrast to known ADC's in which the total signal which can be contributed by any range $N$ (other than the first) is limited to one digit of the ($N$–1) th range less one digit of the $N$th range. The way in which the modification proposed by this invention enables the overall range of the ADC to be extended will be made clear in the following description, given by way of example with reference to the accompanying drawings, in which.

Figure 1:
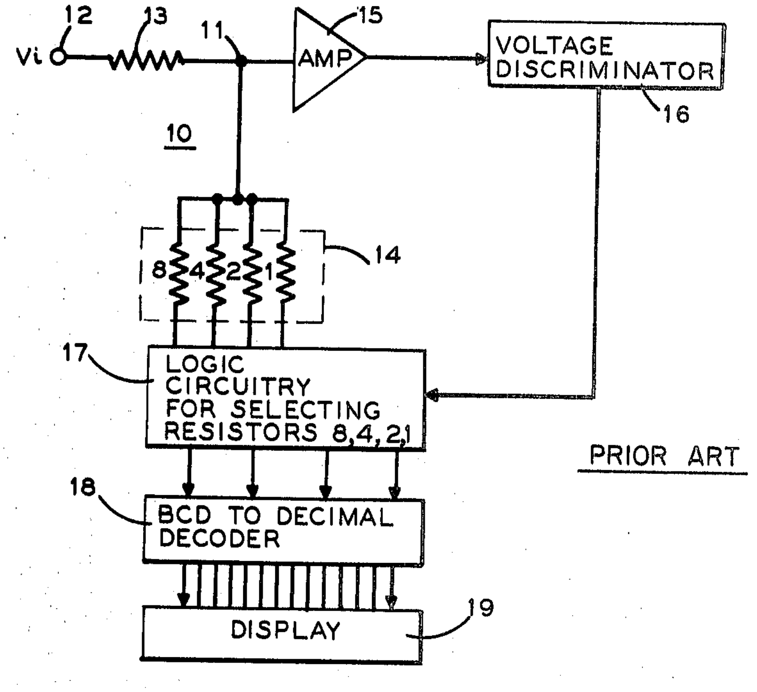
FIG. 1 is a block diagram of a typical prior art ADC.

FIG. 1 designated "Prior Art" illustrates a known form of successive approximation ADC. In the FIG., a weighted potentiometer 10 has a tapping point (or current summing junction) 11 from which arises a current representing the difference between an input current flowing through a resistor 13 from one terminal 12 of the potentiometer (to which terminal the voltage $V_i$ to be measured is applied), and a comparison current whose magnitude is varied in steps by switching successive stages 14 of the potentiometer arrangement into, and sometimes out of, operation. The magnitude of the comparison current is equal to the sum of the currents contributed by those stages which are switched into operation, the stages being arranged to contribute currents which decrease in succession, typically by a factor of two. The tapping point 11 is connected to a current discriminator comprising a virtual-earth amplifier 15 and a voltage discriminator 16. The output of the discriminator is applied to logic circuitry 17 which is arranged to switch the stages into operation in succession, but to switch out of operation again, any stage whose contributory current causes the comparison current to overbalance the input current. A typical stage-interrogation time is 25$\mu$secs.

FIG. 1 shows a voltmeter capable of measuring one decade of voltage only and has four resistive stages 14 calibrated in units of conductance 8, 4, 2, and 1, a conventional B.C.D. code. To illustrate its operation, suppose that the voltmeter was capable of measuring voltage magnitudes between 0 and 9$mV$, and suppose 7$mV$ is applied to terminal 12. The operation of the logic circuitry 17 would proceed as follows:

a. Select stage 8—the comparison current would be greater than the input current and stage 8 would be rejected.

b. Select stage 4—the comparison current is less than the input current: stage 4 retained.

c. Select stage 2—the comparison current is still less than the input current: stage 2 retained.

d. Select stage 1—the comparison current is equal to the input current: stage 1 retained.

The state of the selected switches is then decoded by a binary-coded decimal (B.C.D.) to decimal decoder 18 and the magnitude of the input voltage is displayed digitally by, for example, a numerical indicator tube 19.

Normally the logic circuitry is arranged to inhibit selection of the 4 and 2 stages if an 8 has been selected and retained.

Since such a voltmeter and its associated logic circuitry is well known, being described, for example, in Huskey & Korn, loc. cit. No attempt will be made herein to describe in detail how the logic circuitry 17 controls the potentiometer stages 14.

Briefly summarized, therefore, FIG. 1 and its accompanying description relates to a converter in which a current derived from the input voltage is compared with a series of standard currents. It is equally possible to compare the input voltage directly with a series of standard voltages in a voltage comparator.

Obviously, in a practical ADC the potentiometer stages would be extended over a number of decades. There are, however, practical limits to this. For example, consider a five decade ADC having a full house reading of 19999. This would require a 16 stage digital potentiometer made up as follows: 10,000; 8000, 4000, 2000, 1000; 800, ...; 80, ...; 8, 4, 2, 1. Typically one bit is equivalent to a step input of 100$\mu V$ so the input amplifier 13 must be capable of handling a range of step-input signals between 100$\mu V$ and 1 volt (10,000×100×$10^{16}$). That is, if a 10,000 bit signal is applied to the amplifier 15, the output of the amplifier 15 to the comparator 16 must be true to within 1 bit to prevent spurious instructions to the logic circuitry 17. Inaccuracies can be traced to two principal causes:

a. incorrect resistor values in the potentiometer 10. This would give a permanent linearity error. Resistors having sufficient accuracy can be obtained however, and any residual error can be allowed for during initial calibration of the instrument.

b. errors due to overloading of the input amplifier. This is a temporary effect and appears as a decaying overload error on the output of the amplifier. The error can extend over several interrogation periods and can thus give incorrect readings (or miscounts) when measuring certain voltage levels. The amplifier in a typical commercial ADC with ranges as outlined above is able to accept bit values of 10,000 but the overload effect becomes troublesome for bit values of 20,000 and above. For this reason the full house reading of such an ADC is of necessity limited to 29999 (10,000 +10,000; 8000, 4000, etc). Consider now an ADC having a full house reading of 99999, made up as follows:

| | | | | | |
|---|---|---|---|---|---|
| Bit size | ×$10^4$ | ×$10^3$ | ×$10^2$ | ×$10^1$ | ×$10^0$ |
| Standard signals | 4 2(A) 2(B) 1 | 8 4 2 1 | 8 4 2 1 | 8 4 2 1 | 8 4 2 1 |

Because of the effects of overloading of the amplifier, this ADC is likely to give a miscount when the magnitude of an input voltage is equal to, or just greater then, that provided by the higher standard signals of the most significant decade, i.e. equal to, or just greater than, 20,000, 30,000, 40,000, etc. For example, suppose an input voltage of 4.0002 volts (=40,002 bits) was applied to the input terminal of the ADC. The sequence of operation would be as follows:

a. Select a comparison signal of $4\times10^4$. Because of overshoot, this may appear as 40,005 bits at the output of the amplifier for several interrogation periods. It will appear to the comparator to be too great and will be rejected.

b. The bit size $2\times10^4$ (A) will be selected and retained because the comparison signal is smaller than input voltage.

c. The bit size $2\times10^4$ (B) will be inhibited (or rejected) since 40,000 has been rejected.

d. The bit size $1\times10^4$ is then selected and retained because the total comparison signal is smaller than input.

e. The aforementioned process continues for the lower order digit values or sizes starting with the bit value of $8\times10^3$.

At the end of a measurement cycle the ADC will indicate an apparent input voltage of 3.9999 volts which is obviously in error. The voltmeter will continue to read 3.9999 until the input voltage increases to 4.0005 volts and then the display would correctly indicate 4.0005 volts.

The present invention is based on the realization that the amplifier overload error invariably results in readings overshooting.

Thus, the above-described ADC may be modified in accordance with the present invention as follows:

In the second decade, the logic is so arranged that only the selection of a 4 is inhibited if an 8 has been selected and retained. It is thus possible to select 8+2+1=11 (or 8+2+0=10). The decoder 18 can then be arranged to display a 1 (or an 0) on its own indicator tube and to carry a 1 on to the most significant decade. Thus, if in the second decade (or range) the digit 8 has been selected during the conversion process, the digit 4 is not selected but the digits 2 and 1 (or 2 and 0) are selected so that the second decade can contribute from 1 to 11 digits if the digits 2 and 1 are selected or form 1 to 10 digits if the digits 2 and 0 are selected. This is in contrast to known prior art systems wherein the contribution from the second decade only ranges from 1 to 9 digits.

For example, consider again the conversion of an input voltage of 4.0002 volts (=40,000 bits). The sequence of operation would be:

| | | | | | | | | | | | | | | | | | | | | |
|---|---|---|---|---|---|---|---|---|---|---|---|---|---|---|---|---|---|---|---|---|
| Digit size | | | $\times10^4$ | | | | $\times10^3$ | | | | $\times10^2$ | | | | $\times10^1$ | | | | $\times10^0$ | |
| Standard signals | 4 | 2 | 2 | 1 | 8 | 4 | 2 | 1 | 8 | 4 | 2 | 1 | 8 | 4 | 2 | 1 | 8 | 4 | 2 | 1 |
| Selection | R | S | I | S | S | I | S | R | R | R | R | R | R | R | R | R | R | R | S | R |
| Answer | | | $3\times10^4$ + | | | $10\times10^3$ + | | | | | | 0+ | | | | 0+ | | | | 2 |
| Where | R=rejected | | | | | | | S=retained | | | | | | | | I=inhibited | | | | |

A If ($10\times10^3$ is detected it is only necessary for the decoder to add 1 to the most significant decade to give the correct reading of 4.0002 volts. The total conversion is completed in the same time, but the amplifier has only to cope with the addition of 20,000+10,000+8000+bits in a period equivalent to six interrogation periods rather than a single step input of 40,000 bits. What is more, the amplifier overshoot persisting from the 40,000 bit input and caused by the 20,000 bit input is only present when the comparison signal is substantially less than the input signal. By the time that the comparison signal again approaches equality with the input signal, the overshoot has decayed completely and has no effect on the accuracy of the measurement.

Thus for a slight addition in the cost and complexity of the decoder circuit, the range of this type of successive-approximation D.V.M. can be increased more than three fold.

Figure 2:
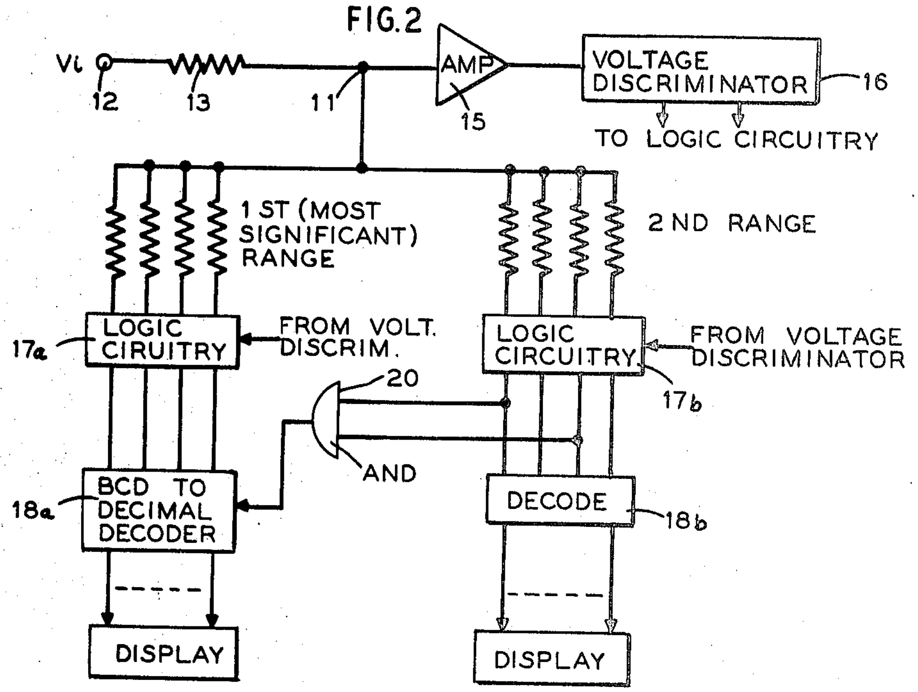
FIGS. 2 and 3 are block diagrams of two embodiments of the present invention, with ranges $N$=2 and 3 respectively.

FIG. 2 illustrates the first two decade ranges of the modified ADC according to the invention. The same reference numerals are used as in FIG. 1 except that elements particular to the first and second ranges are distinguished by subscripts *a* and *b* respectively. Each range operates substantially as in a conventional ADC. The first range logic 17*a* controls the second range logic 17*b* so that the second range does not come into operation until the last stage of the first range has been dealt with.

There are two differences from a conventional ADC. Firstly, the second range logic 17*b* does not inhibit the selection of 2 following the selection of 8 if 4 or 2 has been rejected by the first range. This difference is not illustrated as it requires, as a practical matter, only a trivial modification of the logic circuitry by one working in the art. The second difference involves the addition of an AND gate 20 which responds to the selection of 8 and 2 by the second range logic 17*b* to provide a binary 1 input signal to the first range decoder 18*a*. In this way the first range digit generated by the second range is carried into the first range decoder.

Obviously the technique of inhibiting only the selection of a 4 after the selection of an 8 need not be restricted to the decade following the most significant. It could be applied to any of the lower decades but in this case some further, but still relatively simple, circuitry would be required to allow the ones to propagate through to the most significant decade, as will be apparent to those skilled in the art.

Figure 3:
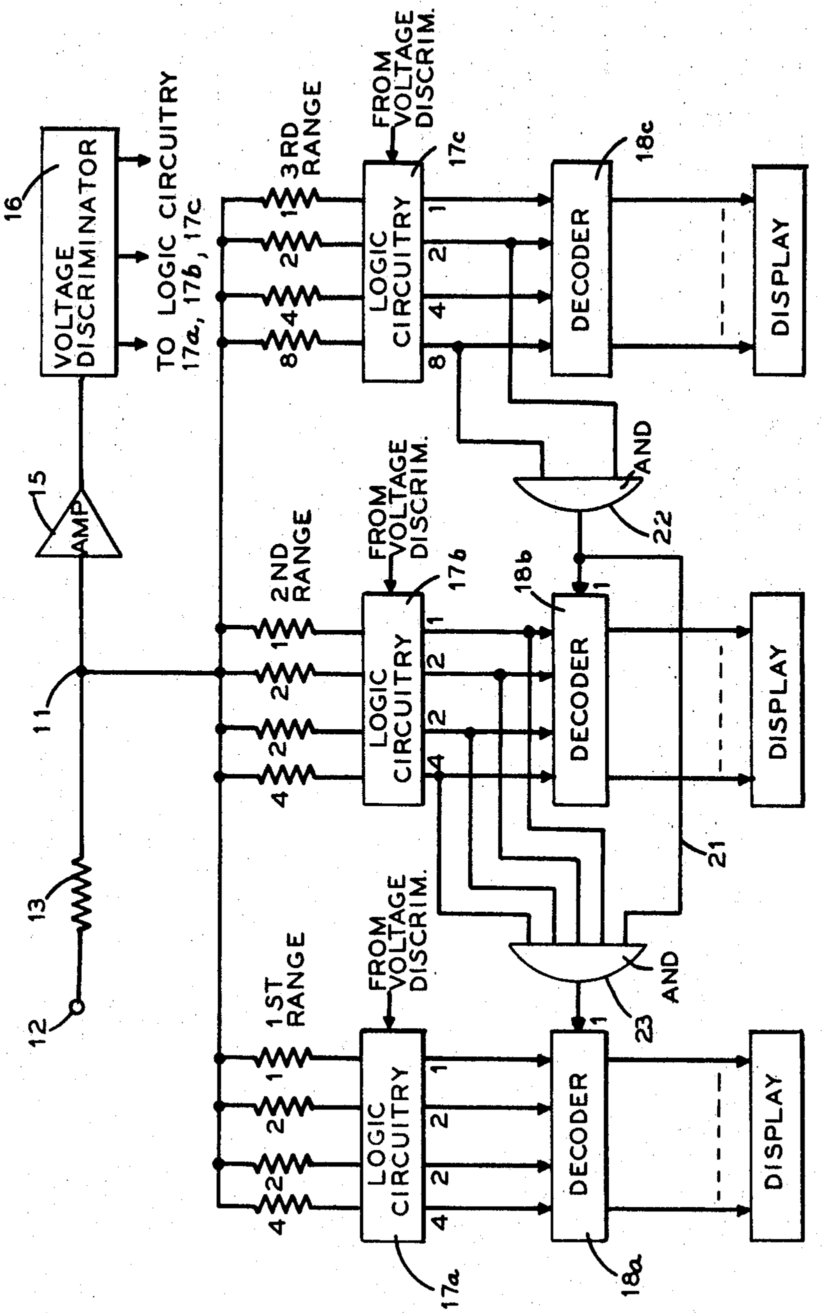

A system for implementing the above technique is illustrated in FIG. 3 wherein there is shown the first three ranges of an ADC, the elements of the third range being distinguished by a subscript *c*. Here the first and second ranges both contribute signals of 4, 2, 2 and 1 of their respective digits. The third range contributes 8, 4, 2, 1 and if 8 is selected only 4 is inhibited if 4 or 2 was selected by the first range, this latter condition being represented by a connection 21 from logic 17*a* to logic 17*c*. If logic 17*c* selects both 8 and 2, a carry signal designated 1 must be propagated to the second range decoder 18*b*. This is effected through the enabling of an AND gate 22. As such a carry will require a carry to propagate to the first range, the output of the gate 22 is applied to another AND gate 23 along with the 4, 2, 2 and 1 outputs of the logic circuitry 17*b*. When all inputs to the gate 23 are energized, the gate 23 is enabled and provides a 1 bit input to the first range decoder 18*a*.

This form of digital carry technique may also be applied to other forms of successive-approximation ADC's, e.g. using inductive dividers and an AC reference source. Moreover, the invention can be used to deal with any transient errors, since errors other than overshoot, such as undershoot and errors caused by inductive resistors, can all be transformed to overshoot errors by applying a small analog offset signal to the terminal 11 to increase the input signal during the first part only of the measuring interval, e.g., only while the most significant range is dealt with.

While there has been described what is at present considered to be one embodiment of this invention, it will be obvious to those skilled in the art that various changes and modifications may be made in the instrument without departing from the invention, and it is, therefore, intended to cover all such changes and modifications as fall within the true spirit and scope of the invention.

I claim:

1. An analog-to-digital converter for successively approximating the magnitude of an input signal comprising, a plurality of decade ranges having different orders of numerical significance, each range including a series of differently weighted electrical signal sources for producing electrical signals having differently weighted signal values, means for sequentially selecting the decade ranges and at least two signal sources within each decade range on a most significant to least significant signal weight basis and retaining certain of said signal sources which will cause the magnitude of the total signal so selected to equal the magnitude of said input signal, and means associated with at least certain of said decade ranges for translating the values of the retained signal sources into a numerical output, logic circuitry responsive to the retaining of the most significant weighted signal source in one of said ranges and the retaining of an additional signal source in said one of said ranges having a weighted value sufficient to generate a carry signal in that range for advancing the translating means associated with at least the range of next higher significance by a constant numerical value.

2. The converter as claimed in claim 1 wherein said logic circuitry comprises and AND gate.

3. The converter as claimed in claim 1 wherein said decade ranges are binary-coded decimal decade ranges and wherein said translating means comprises a binary-coded decimal-to-decimal converter.

4. The converter as claimed in claim 3 wherein said logic circuitry comprises, a gate having one input coupled to the most significant signal source in said one of said ranges and another input coupled to said additional signal source in that range, said gate being enabled by the selection and retention of said most significant signal source and said additional source to pass said carry signal to said translating means associated with said range of next higher significance.